June 12, 1928.

T. A. REID 1,673,591

TEMPERATURE INDICATOR AND CONTROLLER

Filed April 13, 1922

WITNESSES:
R. J. Butler.
J. E. Foster

INVENTOR
Thomas A. Reid.
BY
Wesley G. Carr
ATTORNEY

Patented June 12, 1928.

1,673,591

UNITED STATES PATENT OFFICE.

THOMAS A. REID, OF PITTSBURGH, PENNSYLVANIA, ASSIGNOR TO WESTINGHOUSE ELECTRIC & MANUFACTURING COMPANY, A CORPORATION OF PENNSYLVANIA.

TEMPERATURE INDICATOR AND CONTROLLER.

Application filed April 13, 1922. Serial No. 552,369.

My invention relates to temperature-control apparatus and particularly to temperature-indicating apparatus which may be easily and economically modified to serve also to control the temperature of the device with which it is associated.

One object of my invention is to provide a simple and inexpensive control attachment which may be applied to a temperature-indicating apparatus to co-operate therewith to control the temperature of a furnace, or the like, with which the indicator is associated, by controlling the energy input of the furnace.

Another object of my invention is to provide a device, of the above-indicated character, that may be applied to present indicating instruments without considerable change in the structure to permit the indicating instrument to serve also as a controlling device.

A further object of my invention is to provide a contactive device, that may be applied to an indicating instrument, to be so controlled by the indicating member or pointer thereof as to maintain the temperature of the furnace within a predetermined range.

In practicing my invention, I provide a contactive device that may be disposed at a predetermined position in the path that may be traversed by the indicating member. The contactive device may be disposed at any position in the path corresponding to the temperature which it is desired to maintain in the furnace. The contactive device comprises a plurality of thermally-responsive members that are influenced by a heater supported on, and carried by, the indicating member, or pointer, of the indicating instrument.

Figure 1:
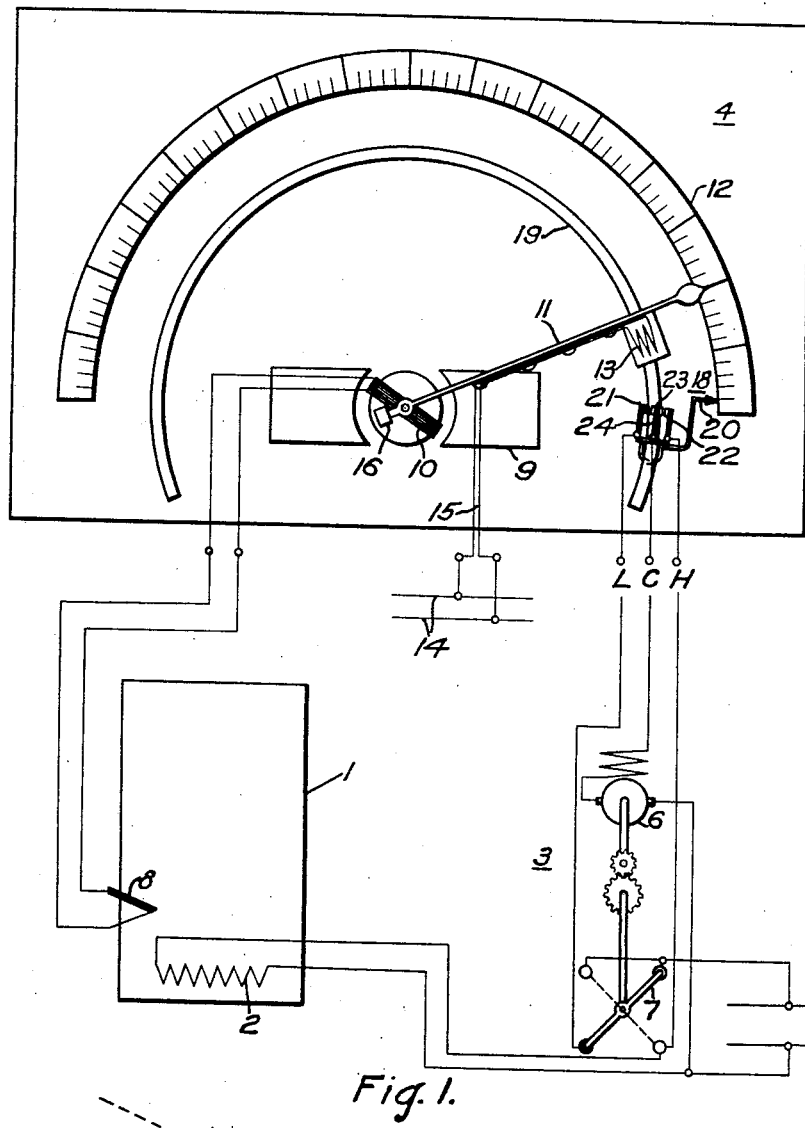
Figure 2:
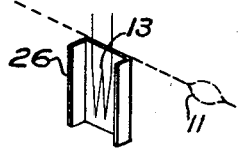
Figure 3:
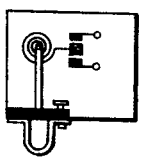

Figure 1 of the accompanying drawings is a diagrammatic view of a temperature-control system containing an indicating and control instrument embodying my invention;

Fig. 2 is a perspective view of a portion of the indicating member and the heater carried thereon, and Fig. 3 is a front elevational view of another form of thermal-responsive contact device that may be applied to the instrument shown in Fig. 1.

As illustrated in Fig. 1, the system comprises, in general, a furnace 1, or other device that is to be heated and that is provided with a heating element 2. A motor-operated snap switch 3 and a temperature indicator and controller 4 are employed to control the energization of the heating element 2, whereby the temperature of the furnace 1 may be maintained substantially constant. Energy for the heating element is provided from a source 5 and is controlled by the motor-operated snap switch 3 in accordance with the operation of the control instrument 4.

The motor-operated snap switch 3 comprises a relatively high-speed rotatable motor 6, a snap switch 7 and suitable gearing therebetween to permit the motor to actuate the switch. The operation of the motor-operated snap switch is controlled by the temperature indicator 4 in accordance with the temperature that is developed within the furnace 1.

The indicator 4 is energized in accordance with the temperature of the furnace 1 by means of a thermocouple 8 that is subjected to the temperature of the furnace. The indicating and controlling instrument 4 comprises a permanent magnet 9 and a movable coil 10, disposed in the magnetic field thereof, to constitute a d'Arsonval movement.

A pointer 11 is controlled by the movable coil 10 and co-operates with a calibrated scale 12 to indicate the temperature of the thermocouple 8 and, therefore, of the furnace. A heating element 13 is mounted on, and carried by, the pointer 11 and is continuously energized from any suitable external source of energy 14 to which it is connected through conductors 15. The pointer 11 is provided with a weight 16 to counterbalance the weight of the heating element 13 and the conductors connecting the heating element to the external circuit.

A contactive device 18 for controlling the operation of the motor-operated snap switch 3 is adapted, by adjustment on a supporting bracket 19, to be disposed at any predetermined position in the path of movement of the heater 13. A pointer 20 is secured to the contactive device 18 and co-operates with the calibrated scale 12 to indicate thereon the temperature of the furnace corresponding to the position of the contactive device 18 at which value the temperature of the furnace will be maintained by the indicating and controlling device 4.

The contactive device 18 comprises two relatively stationary contact members 21 and 22 and a movable contact member 23 that is supported on, and controlled by, a bimetallic element 24. Normaly, at ordinary temperatures, the bimetallic element 24 will effect engagement between the contact members 21 and 23. When heated to a predetermined degree by the heating element 13, engagement is effected between the contact members 22 and 23.

As illustrated in the diagram of the accompanying drawing, the motor-operated snap switch has just been actuated to disconnect the heating element 2 from the circuit 5. As the temperature of the furnace gradually decreases, the pointer 11 moves the heating element 13 away from the contactive device 18, and the influence of the heating element is no longer sufficient to maintain engagement between the contact members 22 and 23.

Engagement of the contact members 21 and 23 completes the circuit of the motor from one conductor of the circuit 5 through the switch 7, in the position that is illustrated in the drawing, and, through the motor, to the other conductor of the circuit 5. The motor is thereupon energized to actuate the switch 7 to the broken-line position, thereby reconnecting the heating element 2 to the circuit 5 to again heat the furnace.

As the temperature of the furnace increases, the heating element 13 is again carried into close proximity to the contact device 18 to effect re-engagement between the contact members 22 and 23. A circuit is thereupon completed from one conductor of the circuit 5 through the switch 7 in the broken-line position, the contact members 22 and 23 and the motor 6 to the other conductor of the circuit 5. The motor is thereupon energized to actuate the switch 7 to the position that is illustrated in the diagram, whereupon the heating element 2 is disconnected from the circuit 5.

The heating element 13 is provided with a heat-retaining shell 26, as illustrated in Fig. 2, that is adapted to partially enclose the contactive device 18 to render its operation more quickly responsive to the heat of the heating element 13.

In Fig. 3, I have shown the contactive device as a spirally-wound bimetallic element for controlling the movable member. By employing a contactive device of this form, relatively quick and sensitive operation may be obtained.

As illustrated in Fig. 1, the pointer 20 of the contactive device 18 is slightly advanced relative to the position of the contactive device to compensate for the difference in the responsiveness of the contactive device to the heating element 12 corresponding to different distances therebetween.

It will be observed that, by applying a relatively simple, inexpensive and rugged contactive device to a relatively sensitive indicating instrument, an inexpensive combination indicating and controlling device may be obtained. The prime importance of the device which I have illustrated resides in the application of a relatively inexpensive control attachment to a sensitive indicating instrument to provide a controller for controlling the temperatures of electric furnaces, or the like.

Although I have described a particular application of the modified instrument in connection with a temperature-controlling system, it is readily obvious that an instrument of such character may be employed to maintain any other predetermined condition or quantity substantially constant by employing the instrument as an auxiliary controller for the main controlling equipment that is employed to maintain the aforementioned condition or quantity at a predetermined value.

Although I have shown a particular form of the device embodied in my invention, it is obvious that modifications may be made therein without departing from the spirit and scope of my invention, as set forth in the appended claims.

I claim as my invention:

1. The combination with an indicating instrument provided with a freely movable indicating member, of a thermally-operable switch adapted to be interposed at any predetermined position in the path of the indicating member but out of contact therewith, and means whereby operation of the switch may be effected by the indicating member.

2. The combination with an indicating instrument provided with a freely movable indicating member, of a thermally-operable switch adapted to be interposed at any predetermined position in the path of the indicating member but out of contact therewith, and thermal means controlled by the indicating member to effect the operation of the switch.

3. The combination with an indicating instrument provided with a freely movable indicating member, of a thermally operable switch adapted to be interposed at any predetermined position in the path of the indicating member but out of contact therewith, and a heater element disposed on the indicating member to effect the operation of the switch when the indicating member attains a predetermined deflection.

4. The combination with a measuring and indicating instrument provided with a freely movable indicating member and a calibrated scale member relatively movable with respect to each other, of a thermally-operative switch device associated with one of said members, a heating device associated with the other member, the device associated with the scale being adjustable to predetermined positions thereof and means on said movable member for concentrating the heat of said heating device on said thermally-operative device.

5. In an indicating instrument, the combination with a freely movable indicating member and a calibrated scale, of a thermally-operable switch adjustable to a predetermined position relative to the scale and a heat-producing means controlled by the indicating member to pass adjacent to the switch but out of contact therewith for effecting operation thereof.

In testimony whereof, I have hereunto subscribed my name this 11th day of April 1922.

THOMAS A. REID.